(12) United States Patent
Lindskog

(10) Patent No.: US 7,263,082 B1
(45) Date of Patent: Aug. 28, 2007

(54) RESOLVING USER-SPECIFIC NARROW BEAM SIGNALS USING A KNOWN SEQUENCE IN A WIRELESS COMMUNICATIONS SYSTEM WITH A COMMON PILOT CHANNEL

(75) Inventor: Erik D. Lindskog, Sunnyvale, CA (US)

(73) Assignee: ArrayComm, LLC, San Jose, CA (US)

( * ) Notice: Subject to any disclaimer, the term of this patent is extended or adjusted under 35 U.S.C. 154(b) by 1051 days.

(21) Appl. No.: 10/186,553

(22) Filed: Jun. 28, 2002

(51) Int. Cl.
*H04B 7/216* (2006.01)
*H04B 1/00* (2006.01)
*H04J 3/06* (2006.01)
*H04L 7/00* (2006.01)

(52) U.S. Cl. .................. 370/335; 370/342; 370/516; 375/371; 375/148

(58) Field of Classification Search ............. 370/335, 370/342, 516; 375/148, 371
See application file for complete search history.

(56) References Cited

U.S. PATENT DOCUMENTS

| | | | | |
|---|---|---|---|---|
| 5,694,388 A * | 12/1997 | Sawahashi et al. | .......... | 370/206 |
| 5,898,665 A * | 4/1999 | Sawahashi et al. | .......... | 370/342 |
| 6,081,549 A * | 6/2000 | Shou et al. | .......... | 375/152 |
| 6,320,853 B1 * | 11/2001 | Wong et al. | .......... | 370/328 |
| 6,426,949 B1 * | 7/2002 | Zhou et al. | .......... | 370/342 |
| 6,757,272 B1 * | 6/2004 | Abeta et al. | .......... | 370/342 |
| 6,895,258 B1 * | 5/2005 | Scherzer et al. | .......... | 455/562.1 |
| 2002/0177468 A1 * | 11/2002 | Takeuchi et al. | .......... | 455/562 |
| 2003/0043775 A1 * | 3/2003 | Kikuchi | .......... | 370/342 |

FOREIGN PATENT DOCUMENTS

| | | |
|---|---|---|
| DE | 10026077 A1 | 12/2001 |
| WO | WO0163776 A2 | 8/2001 |

OTHER PUBLICATIONS

Pederson et al., "A Simple Downlink Antenna Array Algorithm Based on a Hybrid Scheme of Transmit Diversity and Conventional Beamforming", 2001 IEEE, pp. 58-62.
Lindskog et al., "A Transmit Diversity Scheme for Channels with Intersymbol Interference", ICC 2000, Jun. 2000, vol. 1, pp. 307-311.

* cited by examiner

*Primary Examiner*—Steven Nguyen
(74) *Attorney, Agent, or Firm*—Blakely Sokoloff Taylor & Zafman LLP (57) ABSTRACT

A method and apparatus are provided that corrects for differences in reception between a user-specific signal and a common signal. In one embodiment, the invention includes receiving a common pilot signal transmitted on a wide beam at a remote terminal, receiving a user-specific signal transmitted on a directed narrow beam at the remote terminal, demodulating the user-specific signal using the common pilot signal for channel estimation, estimating a phase error in the demodulated user-specific signal using known symbols in the user-specific signal, and correcting for the phase error in the demodulated user-specific signal using the phase error estimates.

22 Claims, 4 Drawing Sheets

RESOLVING USER-SPECIFIC NARROW BEAM SIGNALS USING A KNOWN SEQUENCE IN A WIRELESS COMMUNICATIONS SYSTEM WITH A COMMON PILOT CHANNEL

BACKGROUND OF THE INVENTION

1. Field of the Invention

The present invention relates generally to the field of digital radio signal communications. More particularly, the invention relates to optimizing a user-specific signal for reception using a common pilot or training signal.

2. Description of the Related Art

Many wireless data communication systems transmit training information or pilot signals that the receiving terminal uses to demodulate received traffic, control, overhead or other signals. One such example is the pilot signal transmitted by a base station in a CDMA (code division multiple access) communications system. Typically a single common pilot signal is transmitted to all remote or subscriber terminals in the base station's coverage area. The coverage area of the base station is typically referred to as a sector. Any signals transmitted to any particular user terminal can then be resolved with the help of the timing and phase information in the common pilot signal.

The pilot signal is particularly effective when the signal propagation path for both the pilot and the user-specific signal is the same. In a CDMA system in which the pilot and user-specific signal are sent over the same frequency band from the same antennas but with different scrambling codes, the pilot signal is very effective. However, any difference between signals makes the pilot signal more difficult to use or, in other words, it makes the user-specific signal more difficult to demodulate. If, for example, the user-specific signal is spatially directed toward the remote terminal and the pilot signal is a common sector-wide signal, then the two signals can traverse a different signal propagation path. This will cause the two signals, as received by the remote terminal, to differ.

The propagation channel of the pilot signal and the propagation channel of the traffic channel will differ whenever they are transmitted with beams of different width and shape. The user terminal typically uses the pilot signal to estimate a channel that then is used in the process of demodulating and detecting the symbols transmitted on the traffic channel. The difference in the propagation channel of the pilot signal and the traffic channel therefore reduces the accuracy of the channel estimate. To compensate, each user can be provided with a user-specific pilot signal but this greatly increases the amount of traffic on the network.

BRIEF SUMMARY OF THE INVENTION

A method and apparatus are provided that corrects for differences in reception between a user-specific signal and a common signal. In one embodiment, the invention includes receiving a common pilot signal transmitted on a wide beam at a remote terminal, receiving a user-specific signal transmitted on a directed narrow beam at the remote terminal, demodulating the user-specific signal using the common pilot signal for channel estimation, estimating a phase error in the demodulated user-specific signal using known symbols in the user-specific signal, and correcting for the phase error in the demodulated user-specific signal using the phase error estimates.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Introduction

The channel mismatch between the traffic channel beam and the beam of the pilot channel can be corrected using known symbols in the traffic channel. The user terminal can compensate for the phase error in several different ways. One way is by estimating the phase of the traffic channel constellation and de-rotating it back to the closest constellation point. The estimate can be improved upon by using a small number of known symbols transmitted on the traffic channel to resolve any ambiguity as to which nearest constellation point the signal constellation should be rotated. The phase error compensation can be performed on a per tap basis or after combining the taps in a RAKE receiver. Another way is by re-estimating the traffic channel propagation channel by using the known symbols transmitted by the base station on the traffic channel and using the channel estimated using the sector wide pilot signal.

Using the channel estimated from the sector wide pilot together with a small number of known symbols in the traffic channel requires fewer known symbols in the traffic channel than if only the pilot channel or only the traffic channel were used. If transmit diversity is used, two variations of the pilot can be used, one for each diversity signal. The present invention can be used in wireless base stations and handsets. It is most useful in wireless systems where the pilot signal or training sequence typically is shared among multiple users at the same time. Examples of such wireless systems are WCDMA (Wideband Code Division Multiple Access), cdma2000, IS-95 (Interim Standard 95 of the Telecommunications Industry Association). However it may also be useful in some TDMA (Time Division Multiple Access) systems such as the downlink of HDR (high data rate for CDMA) and GSM (Global System for Mobile Communications).

Process Flow

Figure 1:
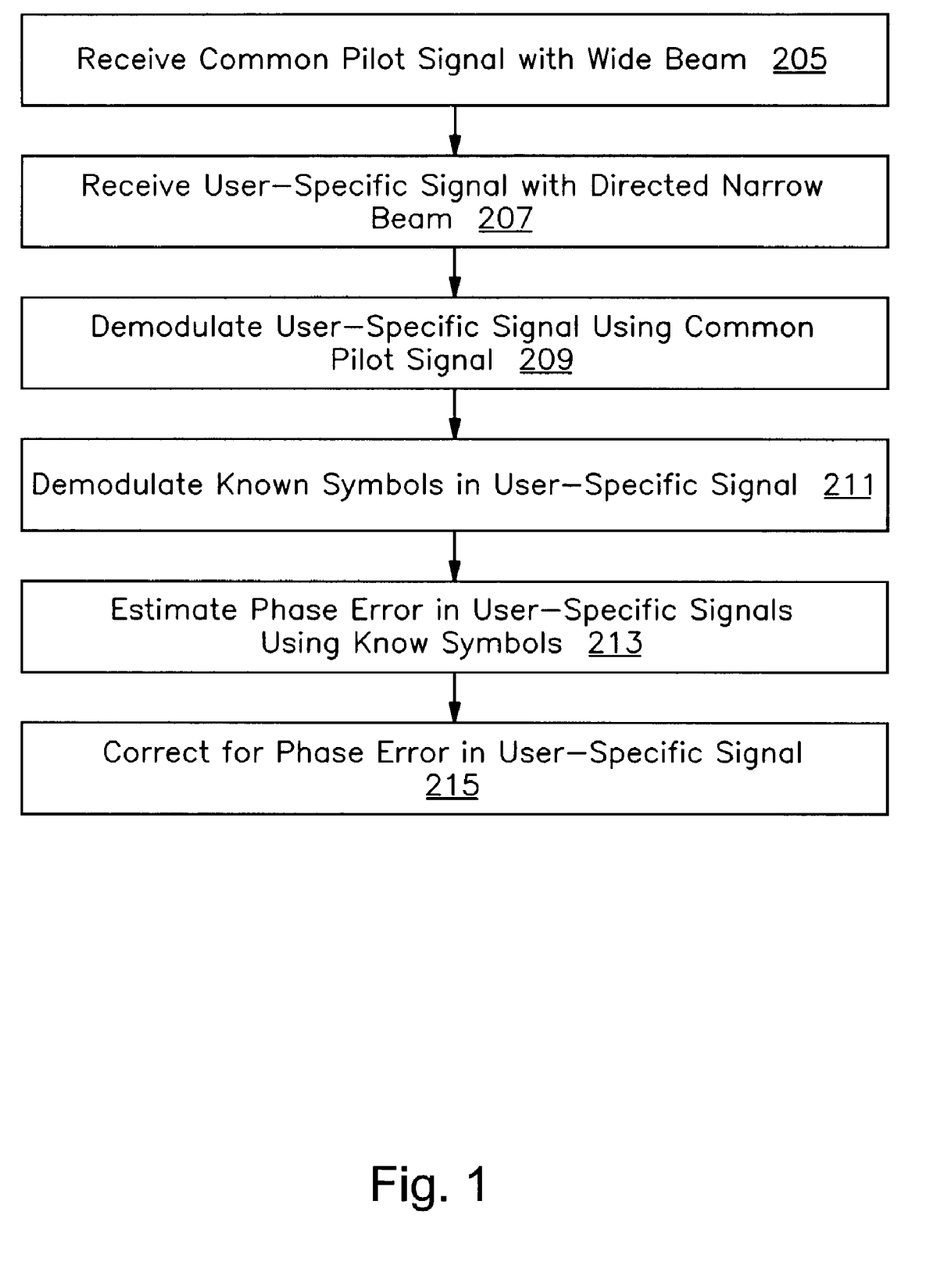
FIG. 1 is a flow chart showing one embodiment of the present invention.

FIG. 1 shows a process flow diagram for optimizing parameters in accordance with the present invention. This process is described in the context of a user terminal (UT) receiving signals from a base station (BS), in a network that includes many base stations, sending signals to any UT's (or subscriber stations or remote terminals) that may be within range of the base stations.

First the UT receives a common pilot signal that was transmitted with a wide beamwidth 205. Many standards for CDMA require such a common pilot signal that is used by all of the UT's within range of one or several base stations. Typically, the common pilot signal is a single sector-wide signal, however, it can also be directed to any type of sub-sector instead. The common pilot provides timing and phase information for demodulating any other signals. The UT also receives a user-specific signal with a directed narrow beamwidth 207. This signal can be a user-specific pilot signal, a traffic channel signal, a control channel signal or any other signal intended only for this particular user. The user-specific signal is received on a different signal propagation path from the common pilot signal due to the difference in beamwidth or in other transmission parameters.

The UT can then demodulate the user-specific signal using the common pilot signal 209, however, this demodulation will be subject to errors due to the differences in the two signals. Accordingly, the UT identifies and demodulates a predetermined set of known symbols in the user-specific signal 211. Because the symbols are known, they can be used to estimate the phase error in the demodulated user-specific signal 213. The estimated phase error can then be applied to correct for the phase error in the whole user-specific signal 215. The short sequence of known symbols is insufficient for training or to acquire timing but long enough only to allow the UT to perform a phase error estimate on the user-specific signal.

The phase errors can be resolved in a multiple tap receiver separately for each tap or as a resulting phase error in a signal combined from many taps in a RAKE receiver. In one embodiment, the known sequence is sufficient only to resolve ambiguities in the phase error of the demodulated user-specific signal. Note that in the present embodiment, the user-specific signal is first demodulated using the pilot signal. Only after this first pass is the known sequence used. This can be done by first establishing taps or complex gains of a multiple tap receiver using only the common pilot signal and applying those established taps to receive the user-specific signal. Then the phase error is estimated using the known symbols of the user-specific signal and this is used to establish replacement taps or complex gains for the multiple tap receiver, or a phase rotation to apply to the output of a RAKE receiver that uses the common pilot signal for channel estimation. The user-specific signal is then demodulated again using the replacement taps or using the RAKE receiver using the common pilot signal followed by the correcting phase rotation.

Figure 2:
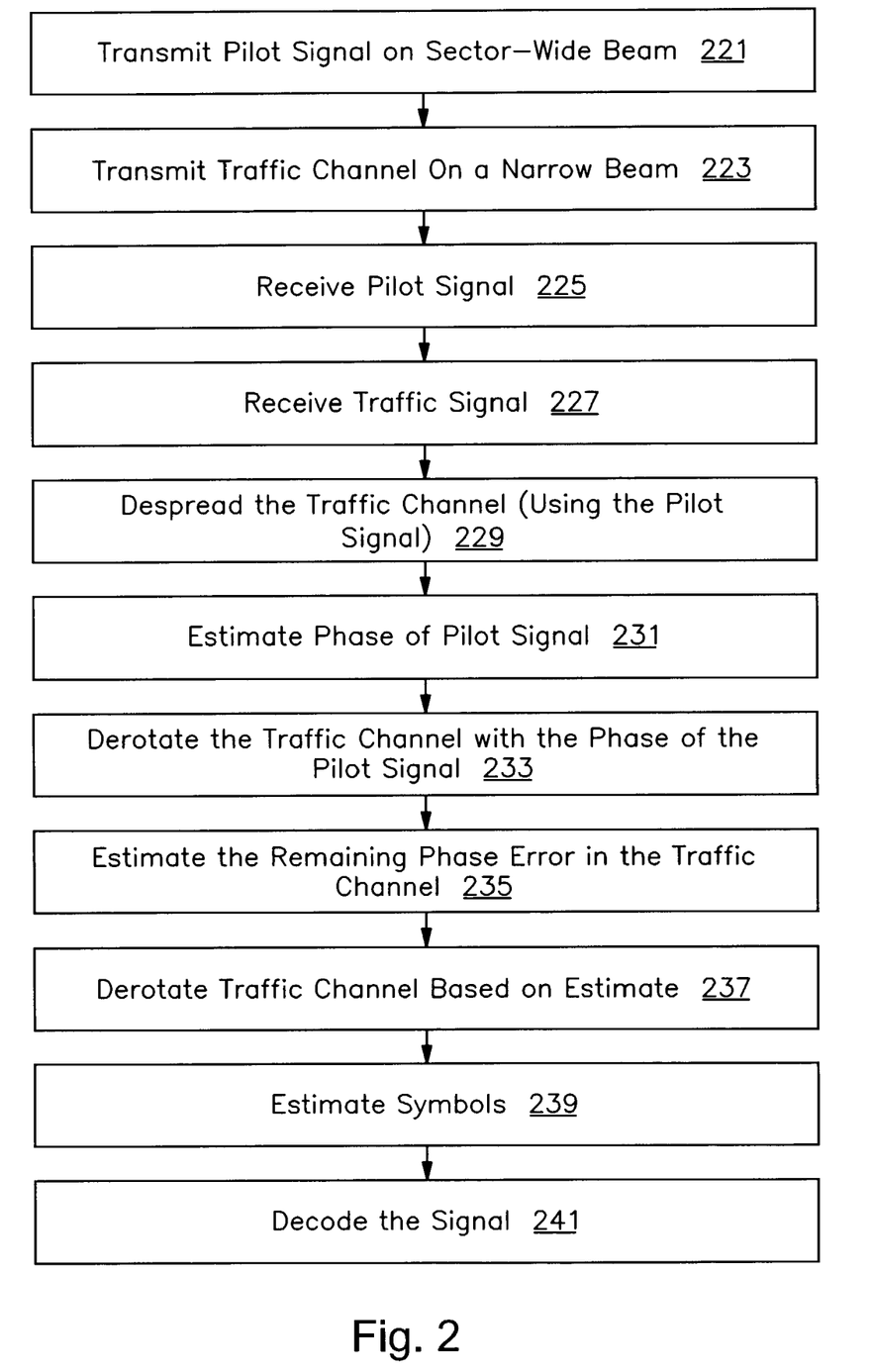
FIG. 2 is a flow chart showing the embodiment of FIG. 1 in greater detail.

FIG. 2 shows a more specific embodiment of the invention described with reference to FIG. 1 and considering both the transmitting station and the receiving station. Again in this case, the invention is described from the perspective of a base station transmitting to a user terminal, but the invention is not so limited. First, the base station transmits a pilot signal on a sector-wide beam 221. It also transmits one or more traffic channel signals 223 on a beam with weights that have been selected to minimize required transmit power using e.g. spatial diversity technologies from an antenna array.

The UT receives the pilot signal 225 and the traffic signal 227, and despreads the traffic channel signal using the pilot signal 229. The UT then estimates the phase of the pilot signal 231 and derotates the traffic channel signal 233 with the phase of the pilot signal. This is performed separately for each tap used. The pilot signal and the traffic signal necessarily differ slightly in phase so this derotation step is inherently in error. Accordingly, the UT next estimates the remaining phase error in the traffic channel 235 using any one of a variety of different ways. As mentioned above, this phase error can be estimated on a tap by tap basis or as a phase error of the signal combined from several taps in a RAKE receiver using the common pilot signal for channel estimation.

One way to estimate the phase error is to estimate the phase blindly from the traffic channel using the distribution of the phases of the derotated traffic channel symbols. To do this, the user terminal estimates the rotation of the signal constellation on the traffic channel. As long as the phase error of the traffic channel is less than half of the minimum phase difference between two symbols, the phase can, without ambiguity, be rotated back to its correct position. This derotation can either be done on a tap by tap basis or on the signal combined from several taps. This estimation process can be applied to TDMA systems as well as to CDMA systems using well-known signal estimation techniques.

As one example, the phase error can be estimated based on an analysis of histograms over the phases of the despread symbol samples. The histograms can be built up using FFT's (fast fourier transforms). If there is no phase error, then, in for example a QPSK (quarternary phase shift keying) signal, such a histogram should have four peaks aligned with the phases of the symbols in the signal constellation. By estimating how much the peaks deviate from these locations, the phase error in the dedicated channels can be estimated and corrected. The histograms can be plotted as a curve and a sine wave fitted to the histogram curve. The phase of the sine wave can be used as an estimate of the phase error in the traffic channel. Using this approach on a QPSK signal received with about 2 db SNR (signal to noise ratio), it is possible to estimate the phase error to an accuracy of about 10 degrees or less.

Another way to estimate the phase error is to use the phases of dedicated pilot symbols transmitted in the traffic channel or other dedicated channel. The phase error can be estimated for each tap or only for the combined signal from all taps. If the base station periodically transmits a few known symbols on the traffic channel, then these symbols can be used to estimate the phase error of the traffic channel, either tap by tap or on a combined signal from several taps or both. The phase of the traffic channel (taps) can be estimated using well known techniques for channel estimation. This approach to phase error estimation is not limited to phase errors within any particular range. It can also be adjusted to accommodate a range of different signal to noise ratios by adjusting the number of known symbols that are transmitted in the dedicated channel.

A third way to estimate the phase error is to estimate the phase blindly from the traffic channel using the distribution of the phases of the derotated traffic channel symbols and use the phases of some dedicated pilot symbols to resolve any ambiguity in which way to derotate the traffic channel. This approach combines the two ways described above. The blind correction approach can be used to estimate the phase of the traffic channel up to an ambiguity, the ambiguity being the signal constellation point to which the traffic channel should be derotated. The small number of known symbols in the traffic channel can then be used to resolve the ambiguity, i.e. to select the signal constellation point.

In another embodiment, the known symbols in the traffic channel can be used to re-estimate the value of all the taps detected in the pilot signal channel. This may require more known symbols to be transmitted than compensating for the phase of the taps or the phase of the combined signal from all taps. In any of the examples described above, by using a channel estimate from the pilot signal channel, a better channel estimate can be derived than can be done using only the known symbols of the traffic channel.

It has been found that in signals structured in accordance with the WCDMA standards, acceptable results can be obtained using one dedicated pilot symbol per slot during one frame. This amounts to using a total of 15 dedicated pilot symbols, spread out over one WCDMA frame (10 ms long). An estimate of the phase error in the traffic channel can be developed using the above techniques with an error of about 10 degrees or less. One dedicated pilot symbol per slot amounts to about 5% of the total 'space' in each slot. The phase error of 10 degrees gives only a very small degradation in the performance.

All of the approaches described above significantly reduce the sensitivity of the receiver to the differences between a beam formed traffic channel and a sector-wide pilot signal. This reduction in sensitivity to the difference in phase between the channel of the traffic signal and the channel of the pilot signal can greatly improve the receiver's performance.

Finally having estimated the phase error, the traffic channel is derotated with the estimated phase error 237. This can be done on the combined signal after all taps are combined or on a per tap basis before combining. Alternatively the channel for the user can be completely re-estimated using information of where the taps are from the pilot signal and estimates of the complex gains of each tap based on the dedicated pilot symbols. It may also be possible to use the estimates of the tap complex gains as a priori information. With the phase error corrected, the traffic channel symbols can be estimated 239 and the signal decoded 241.

Base Station Structure

In one embodiment as discussed above, the present invention is implemented in an SDMA (Spatial Division Multiple Access) radio data communications system. In such a spatial division system, each terminal is associated with a set of spatial parameters that relate to the radio communications channel between, for example, the base station and a user terminal. The spatial parameters comprise a spatial signature for each terminal. Using the spatial signature and arrayed antennas, the RF energy from the base station can be more precisely directed at a single user terminal, reducing interference with and lowering the noise threshold for other user terminals. Conversely, data received from several different user terminals at the same time can be resolved at lower receive energy levels. With spatial division antennas at the user terminals, the RF energy required for communications can be even less. The benefits are even greater for subscribers that are spatially separated from one another. The spatial signatures can include such things as the spatial location of the transmitters, the directions-of-arrival (DOAs), times-of-arrival (TOAs) and the distance from the base station.

Estimates of parameters such as signal power levels, DOAs, and TOAs can be determined using known training sequences placed in digital data streams for the purpose of channel equalization in conjunction with sensor (antenna) array information. This information is then used to calculate appropriate weights for spatial demultiplexers, multiplexers, and combiners. Techniques well known in the art, can be used to exploit the properties of the training sequences in determining spatial parameters. Further details regarding the use of spatial division and SDMA systems are described, for example, in U.S. Pat. Nos. 5,828,658, issued Oct. 27, 1998 to Ottersten et al. and 5,642,353, issued Jun. 24, 1997 to Roy, III et al.

(SDMA) technology can be combined with other multiple access systems, such as time division multiple access (TDMA), frequency division multiple access (FDMA) and code division multiple access (CDMA). Multiple access can be combined with frequency division duplexing (FDD) or time division duplexing (TDD).

Figure 3:
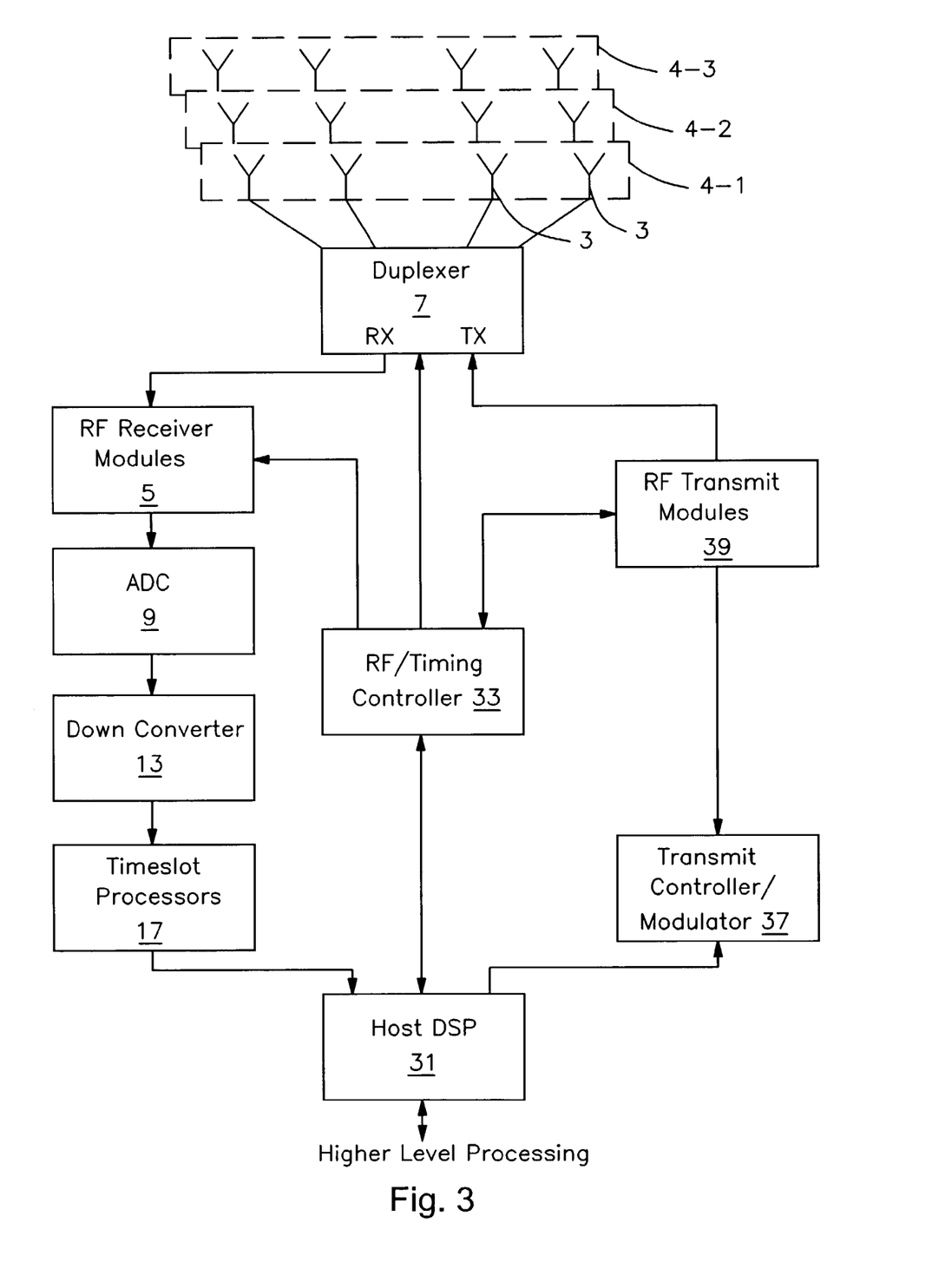
FIG. 3 is a simplified block diagram of a base station on which an embodiment of the invention can be implemented.

FIG. 3 shows an example of a base station of a wireless communications system or network suitable for implementing the present invention. The base station uses SDMA technology which can be combined with other multiple access systems, such as time division multiple access (TDMA), frequency division multiple access (FDMA) and code division multiple access (CDMA). Multiple access can be combined with frequency division duplexing (FDD) or time division duplexing (TDD). The system or network includes a number of subscriber stations, also referred to as remote terminals or user terminals, such as that shown in FIG. 4. The base station may be connected to a wide area network (WAN) through its host DSP 31 for providing any required data services and connections external to the immediate wireless system.

To support spatial diversity, a plurality of antennas 3 is used to form an antenna array 4, for example four antennas, although other numbers of antennas may be selected. Each antenna is an element of a four-element array 4. And a plurality of arrays are provided 4-1,4-2,4-3. The antenna elements may have a spacing of from one-quarter to four wavelengths of a typical carrier frequency while the arrays may be separated by ten or twenty wavelengths. The best spacing for spatial diversity will depend upon the particular frequencies involved, the physical installation and other aspects of the system. In many applications, the spacing between antenna elements of each array can be less than two wavelengths of the received signal. The spacing between antenna arrays can be more than two wavelengths of the received signal. In general, the spacing between elements in an array is selected to minimize grating lobes when transmissions from each element are coherently combined. In an alternative approach, the arrays are spaced apart so as to form a uniform array of elements. The distance between nearest elements in different arrays is the same as the spacing between elements within an array. As mentioned above, it is also possible for each array to have only a single element.

A set of spatial multiplexing weights for each subscriber station are applied to the respective modulated signals to produce spatially multiplexed signals to be transmitted by the bank of four antennas. The host DSP 31 produces and maintains spatial signatures for each subscriber station for each conventional channel and calculates spatial multiplexing and demultiplexing weights using received signal measurements. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. The channels used may be partitioned in any manner. In one embodiment the channels used may be partitioned as defined in the GSM (Global System for Mobile Communications) air interface, or any other time division air interface protocol, such as Digital Cellular, PCS (Personal Communication System), PHS (Personal Handyphone System) or WLL (Wireless Local Loop). Alternatively, continuous analog or CDMA channels can be used.

The outputs of the antennas are connected to a duplexer switch 7, which in a TDD embodiment, may be a time switch. Two possible implementations of the duplexer switch are as a frequency duplexer in a frequency division duplex (FDD) system, and as a time switch in a time division duplex (TDD) system. When receiving, the antenna outputs are connected via the duplexer switch to a receiver 5, and are converted down in analog by RF receiver ("RX") modules 5 from the carrier frequency to an FM intermediate frequency ("IF"). This signal then is digitized (sampled) by analog to digital converters ("ADCs") 9. Final down-converting to baseband is carried out digitally. Digital filters can be used to implement the down-converting and the digital filtering, the latter using finite impulse response (FIR) filtering techniques. This is shown as block 13. The invention can be adapted to suit a wide variety of RF and IF carrier frequencies and bands.

There are, in the example of GSM, eight down-converted outputs from each antenna's digital filter 13, one per receive timeslot. The particular number of timeslots can be varied to suit network needs. While GSM uses eight uplink and eight downlink timeslots for each TDMA frame, desirable results can also be achieved with any number of TDMA timeslots for the uplink and downlink in each frame. For each of the eight receive timeslots, the four down-converted outputs from the four antennas are fed to a digital signal processor (DSP) 31 an ASIC (Application Specific Integrated Circuit) or FPGA (Field Programmable Gate Array) (hereinafter "timeslot processor") for further processing, including calibration, according to one aspect of this invention. For TDMA signals, eight Motorola DSP56300 Family DSPs can be used as timeslot processors, one per receive timeslot. The timeslot processors 17 monitor the received signal power and estimate the frequency offset and time alignment. They also determine smart antenna weights for each antenna element. These are used in the SDMA scheme to determine a signal from a particular remote user and to demodulate the determined signal. In a WCDMA system, the channels may be separated using codes in an FPGA and then further processed separately perhaps using separate DSPs for different users. Instead of being timeslot processors the processors are channel processors.

The output of the timeslot processors 17 is demodulated burst data for each of the eight receive timeslots. This data is sent to the host DSP processor 31 whose main function is to control all elements of the system and interface with the higher level processing, which is the processing which deals with what signals are required for communications in all the different control and service communication channels defined in the system's communication protocol. The host DSP 31 can be a Motorola DSP56300 Family DSP. In addition, timeslot processors send the determined receive weights for each user terminal to the host DSP 31. The host DSP 31 maintains state and timing information, receives uplink burst data from the timeslot processors 17, and programs the timeslot processors 17. In addition it decrypts, descrambles, checks error correcting code, and deconstructs bursts of the uplink signals, then formats the uplink signals to be sent for higher level processing in other parts of the base station.

Furthermore DSP 31 may include a memory element to store data, instructions, or hopping functions or sequences. Alternatively, the base station may have a separate memory element or have access to an auxiliary memory element. With respect to the other parts of the base station it formats service data and traffic data for further higher processing in the base station, receives downlink messages and traffic data from the other parts of the base station, processes the downlink bursts and formats and sends the downlink bursts to a transmit controller/modulator, shown as 37. The host DSP also manages programming of other components of the base station including the transmit controller/modulator 37 and the RF timing controller shown as 33. The RF controller 33 reads and transmits power monitoring and control values, controls the duplexer 7 and receives timing parameters and other settings for each burst from the host DSP 31.

The transmit controller/modulator 37, receives transmit data from the host DSP 31. The transmit controller uses this data to produce analog IF outputs which are sent to the RF transmitter (TX) modules 39. Specifically, the received data bits are converted into a complex modulated signal, up-converted to an IF frequency, sampled, multiplied by transmit weights obtained from host DSP 31, and converted via digital to analog converters ("DACs") which are part of transmit controller/modulator 37 to analog transmit waveforms. The analog waveforms are sent to the transmit modules 39. The transmit modules 39 up-convert the signals to the transmission frequency and amplify the signals. The amplified transmission signal outputs are sent to antennas 3 via the duplexer/time switch 7. In a CDMA system, the signals may also be spread and scrambled using appropriate codes.

User Terminal Structure

Figure 4:
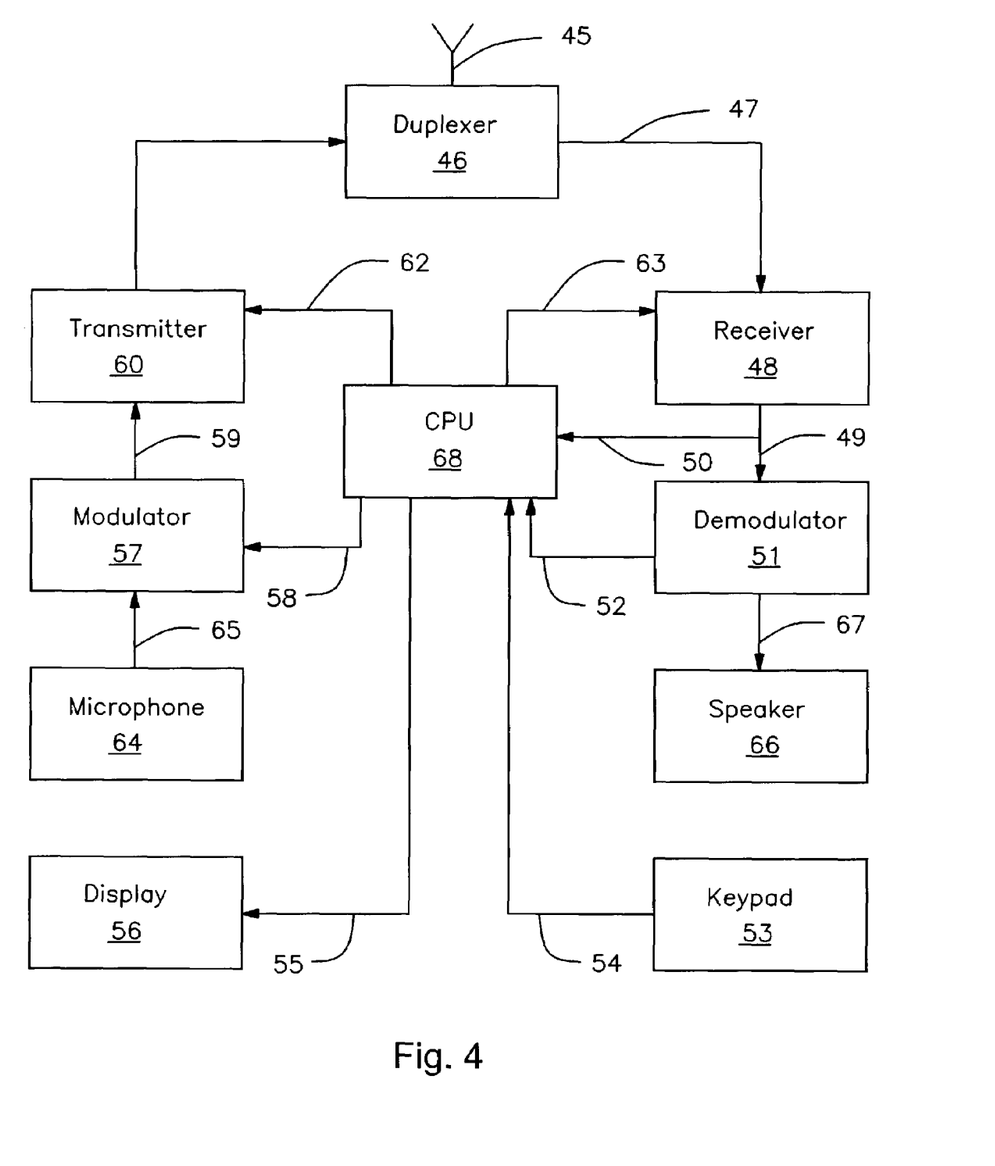
FIG. 4 is a block diagram of a remote terminal on which an embodiment of the invention can be implemented.

FIG. 4 depicts an example component arrangement in a remote terminal that provides data or voice communication. The remote terminal's antenna 45 is connected to a duplexer 46 to permit the antenna 45 to be used for both transmission and reception. The antenna can be omni-directional or directional. For optimal performance, the antenna can be made up of multiple elements and employ spatial processing as discussed above for the base station. In an alternate embodiment, separate receive and transmit antennas are used eliminating the need for the duplexer 46. In another alternate embodiment, where time division duplexing is used, a transmit/receive (TR) switch can be used instead of a duplexer as is well known in the art. The duplexer output 47 serves as input to a receiver 48. The receiver 48 produces a down-converted signal 49, which is the input to a demodulator 51. A demodulated received sound or voice signal 67 is input to a speaker 66.

The remote terminal has a corresponding transmit chain in which data or voice to be transmitted is modulated in a modulator 57. The modulated signal to be transmitted 59, output by the modulator 57, is up-converted and amplified by a transmitter 60, producing a transmitter output signal 61. The transmitter output 61 is then input to the duplexer 46 for transmission by the antenna 45.

The demodulated received data 52 is supplied to a remote terminal central processing unit 68 (CPU) as is received data before demodulation 50. The remote terminal CPU 68 can be implemented with a standard DSP (digital signal processor) device such as a Motorola series 56300 Family DSP. This DSP can also perform the functions of the demodulator 51 and the modulator 57. The remote terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 and the demodulator 51 through lines 65 and 67, respectively for a voice communications remote terminal. In another embodiment, the microphone and speaker are also in direct communication with the CPU to provide voice or data communications. Furthermore remote terminal CPU 68 may also include a memory element to store data, instructions, and hopping functions or sequences. Alternatively, the remote terminal may have a separate memory element or have access to an auxiliary memory element.

In one embodiment, the speaker 66, and the microphone 64 are replaced or augmented by digital interfaces well-known in the art that allow data to be transmitted to and from an external data processing device (for example, a computer). In one embodiment, the remote terminal's CPU is coupled to a standard digital interface such as a PCMCIA interface to an external computer and the display, keyboard, microphone and speaker are a part of the external computer. The remote terminal's CPU 68 communicates with these components through the digital interface and the external computer's controller. For data only communications, the microphone and speaker can be deleted. For voice only communications, the keyboard and display can be deleted.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known circuits, structures, devices, and techniques have been shown in block diagram form or without detail in order not to obscure the understanding of this description.

The present invention includes various steps. The steps of the present invention may be performed by hardware components, such as those shown in FIGS. 3 and 4, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, many of the steps described as being performed by the base station may be performed by the user terminal and vice versa. Furthermore, the invention is equally applicable to systems in which terminals communicate with each other without either one being designated as a base station, a user terminal, a remote terminal or a subscriber station. Thus, the present invention is equally applicable and useful in a peer-to-peer wireless network of communications devices using spatial processing. These devices may be cellular phones, PDA's, laptop computers, or any other wireless devices. Generally, since both the base stations and the terminals use radio waves, these communications devices of wireless communications networks may be generally referred to as radios.

In portions of the description above, only the base station is described as performing spatial processing using adaptive antenna arrays. However, the user terminals can also contain antenna arrays, and can also perform spatial processing both on receiving and transmitting (uplink and downlink) within the scope of the present invention.

Furthermore, in portions of the description above, certain functions performed by a base station could be coordinated across the network, to be performed cooperatively with a number of base stations. For example, each base station antenna array could be a part of a different base station. The base station's could share processing and transceiving functions. Alternatively, a central base station controller could perform many of the functions described above and use the antenna arrays of one or more base stations to transmit and receive signals.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A method comprising:
    receiving a common pilot signal transmitted on a wide beam at a remote terminal;
    establishing taps of a multiple tap receiver using the common pilot signal and applying the established taps to receive a user-specific signal transmitted on a directed narrow beam at the remote terminal;
    demodulating the user-specific signal using the common pilot signal for channel estimation;
    estimating a phase error in the demodulated user-specific signal using known symbols in the user-specific signal to establish replacement taps of the multiple tap receiver; and
    correcting for the phase error in the demodulated user-specific signal using the phase error estimates.

2. The method of claim 1, wherein estimating the phase error comprises estimating the phase error in a multiple tap receiver separately for each tap.

3. The method of claim 1, wherein estimating the phase error comprises estimating the phase error of a signal combined from multiple taps.

4. The method of claim 1, wherein estimating the phase error comprises using known symbols in the traffic signal to resolve ambiguities in the phase error of the demodulated user-specific signal.

5. The method of claim 4, wherein resolving ambiguities comprises resolving ambiguities of the phase error in a multiple tap receiver separately for each tap.

6. The method of claim 4, wherein resolving ambiguities comprises resolving ambiguities of the phase error in a signal combined from multiple taps.

7. The method of claim 1, comprising using known symbols in the traffic signal to improve an estimate of the phase error of the demodulated dedicated signal estimated without using known symbols in the dedicated signal.

8. The method of claim 7, wherein the improvements in the estimates of the phase errors are performed on a tap-by-tap basis.

9. The method of claim 7, wherein the improvements in the estimates of the phase errors are performed on a signal combined from multiple taps.

10. The method of claim 1, wherein estimating the phase error comprises using the known symbols of the user-specific signal to establish replacement complex gains for the taps of the multiple tap receiver.

11. A machine-readable medium having stored thereon data representing instructions which, when executed by a machine, cause the machine to perform operations comprising:
   receiving a common pilot signal transmitted on a wide beam at a remote terminal;
   establishing taps of a multiple tap receiver using the common pilot signal and applying the established taps to receive a user-specific signal transmitted on a directed narrow beam at the remote terminal;
   demodulating the user-specific signal using the common pilot signal for channel estimation;
   estimating a phase error in the demodulated user-specific signal using known symbols in the user-specific signal to establish replacement taps of the multiple tap receiver; and
   correcting for the phase error in the demodulated user-specific signal using the phase error estimates.

12. The medium of claim 11, wherein the instructions for estimating the phase error comprise instructions which, when executed by the machine, cause the machine to perform further operations comprising estimating the phase error in a multiple tap receiver separately for each tap.

13. The medium of claim 11, wherein the instructions for estimating the phase error comprise instructions which, when executed by the machine, cause the machine to perform further operations comprising estimating the phase error of a signal combined from multiple taps.

14. The medium of claim 11, wherein the instructions for estimating the phase error comprise instructions which, when executed by the machine, cause the machine to perform further operations comprising using known symbols in the traffic signal to resolve ambiguities in the phase error of the demodulated user-specific signal.

15. The medium of claim 14, wherein resolving ambiguities comprises resolving ambiguities of the phase error in a multiple tap receiver separately for each tap.

16. The medium of claim 11, comprising instructions which, when executed by the machine, cause the machine to perform further operations comprising using known symbols in the traffic signal to improve an estimate of the phase error of the demodulated dedicated signal estimated without using known symbols in the dedicated signal.

17. The medium of claim 16, wherein the improvements in the estimates of the phase errors are performed on a signal combined from multiple taps.

18. An apparatus comprising:
   a multiple tap receiver to receive a common pilot signal transmitted on a wide beam at a remote terminal and a user-specific signal transmitted on a directed narrow beam at the remote terminal, the multiple tap receiver establishing taps using the common pilot signal and applying the established taps to receive the user-specific signal;
   a demodulator to demodulate the user-specific signal using the common pilot signal for channel estimation; and
   a signal processor to estimate a phase error in the demodulated user-specific signal using known symbols in the user-specific signal to establish replacement complex gains for the multiple tap receiver, and to correct for the phase error in the demodulated user-specific signal using the phase error estimates.

19. The apparatus of claim 18, wherein the signal processor estimates the phase error by estimating the phase error of a signal combined from multiple taps.

20. The apparatus of claim 18, wherein the processor estimates the phase error by using known symbols in the traffic signal to resolve ambiguities in the phase error of the demodulated user-specific signal.

21. The apparatus of claim 20, wherein the processor resolves ambiguities by resolving ambiguities of the phase error in a signal combined from multiple taps.

22. The apparatus of claim 18, wherein the processor estimates the phase error by using the known symbols of the user-specific signal to establish replacement taps for the multiple tap receiver.

* * * * *